B. F. FOWLER.
CREAM WHIP.
APPLICATION FILED DEC. 18, 1918.
1,310,861.
Patented July 22, 1919.
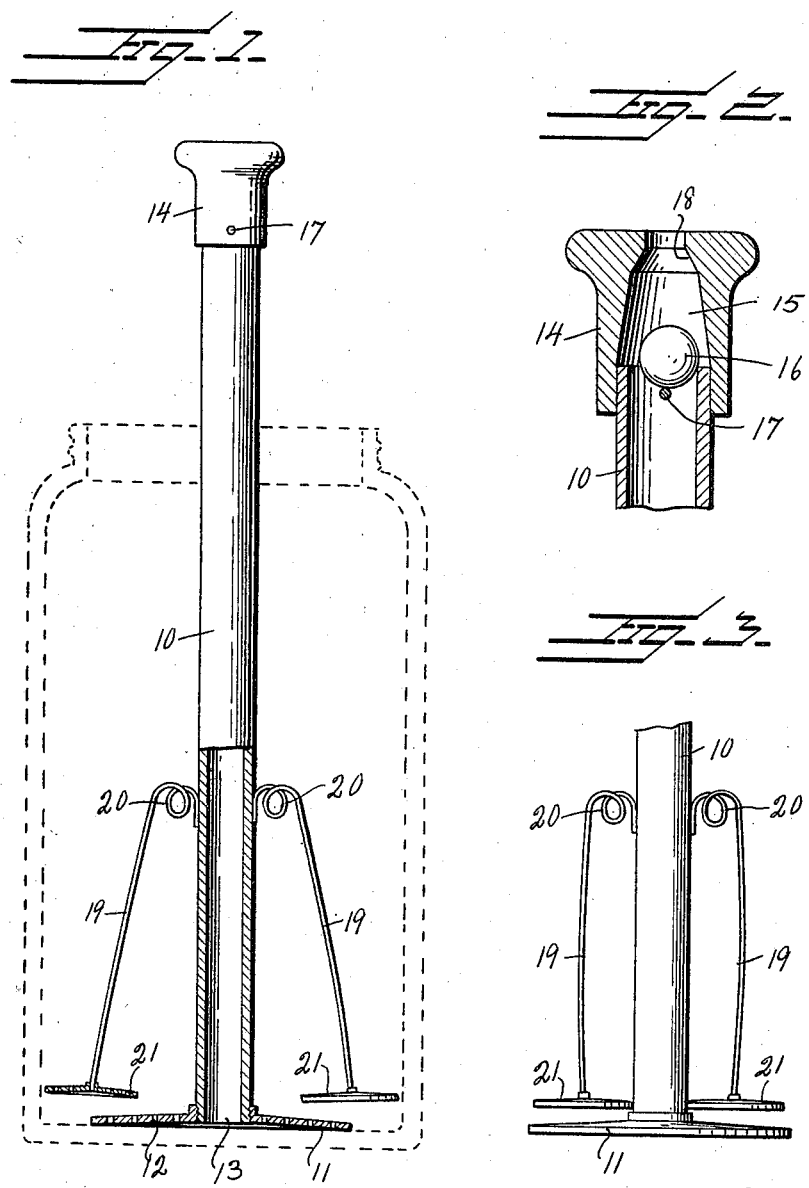
Inventor
B. F. Fowler
By Watson E. Coleman
Attorney

UNITED STATES PATENT OFFICE.

BENJAMIN F. FOWLER, OF MINNEAPOLIS, MINNESOTA.

CREAM-WHIP.

1,310,861.  Specification of Letters Patent.  Patented July 22, 1919.

Application filed December 18, 1918. Serial No. 267,299.

*To all whom it may concern:*

Be it known that I, BENJAMIN F. FOWLER, a citizen of the United States, residing at Minneapolis, in the county of Hennepin and State of Minnesota, have invented certain new and useful Improvements in Cream-Whips, of which the following is a specification, reference being had to the accompanying drawings.

This invention relates to culinary appliances, and particularly to devices for whipping or beating eggs, cream and the like.

The general object of the invention is to provide a very simple and effective whip of this character so designed that upon a downward movement of the egg whip air will be forced downward into the material being beaten and upon an upward movement of the implement the air will be allowed to flow into the handle of the whip.

A further object is to provide a device of this character which is adapted to be used in jars having relatively narrow mouths so as to prevent the contents of the jar from being spilled or spattered while it is being whipped.

Other objects will appear in the course of the following description.

My invention is illustrated in the accompanying drawings, wherein:—

Figure 1 is a side elevation of my improved cream whip, parts being shown in section;

Fig. 2 is a detail sectional view of the upper end of the device;

Fig. 3 is an elevation of the lower portion of the device, with the springs compressed so that the device may be inserted within a jar.

Referring to this drawing, 10 designates the shank of the handle which is tubular and at its lower end there is provided a disk 11 somewhat concave in form and perforated as at 12. The lower end of the shank 10 has an opening 13 below this disk so that the air will be forced into the liquid being whipped upon each downward movement of the device. At its upper end the shank is provided with a knob 14 which fits over the shank and is formed with an upwardly tapering, centrally disposed passage 15 opening upon the upper end of the knob. Within this knob 14 is disposed a ball valve 16 normally resting upon a transversely extending pin 17, this ball valve seating at its upper end upon the seat 18 formed at the upper end of the passage through the knob.

Disposed on the shank 10 and extending downward therefrom are a plurality of spring arms 19, the upper end of which are coiled and attached to the shank in any suitable manner, the coils being designated 20 and the lower end of each arm carries upon it a perforated concave disk 21, the center of which is disposed coincident with the circumference of the disk 11. These disks 21 are disposed slightly above the disk 11 and are of such diameter that the arms 19 may be compressed toward the shank to carry the disks 21 inward into a position where they will not project out beyond the circumference of the disk 11. These spring arms carrying the disks 21 permit this beater or whip to be inserted in a relatively small mouthed jar and then the arms 19 will expand so as to carry the disks outward beyond the wall of the jar and permit the whip to be used without any liability of spilling the contents of the jar. I do not wish to be limited to any number of these disks and arms 19 nor to the details of construction.

Preferably the disk 11 will have a diameter of about 2" in diameter and the small disks about ¾" in diameter. When this device is operated the reciprocation of the whip will cause the air to be forced downward through the perforations in the lower disk 11 and up through the cream or other material being whipped and the reciprocation of the disk 11 and the disks 21 with the air forced up through the disk will cause the cream to whip very quickly. The device may be also used as an egg beater or for mixing or beating any other liquid or semi-liquid material. The resilience of the arms 19 causes the disk 21 to fit closely against the inner wall of the jar.

I claim:—

1. An agitating device of the character described comprising a reciprocatable shank, a plurality of resilient arms mounted upon the shank and extending downward and outward therefrom resiliently urged outward at their lower ends, and perforated disks carried by said arms at their lower ends.

2. An agitator of the character described comprising a shank, a perforated disk mounted on the lower end of the shank, a plurality of resilient arms mounted on the shank and above the disk and extending downward and outward, the resilience of the arms urging their lower ends outward but permitting the lower ends of the arms to be forced inward toward the shank, and relatively small perforated disks mounted upon the lower ends of said arms in parallel relation to the first named disk.

3. An agitator of the character described comprising a shank, resilient arms attached at their upper ends to the shank and normally extending downward and outward therefrom and carrying agitator members at their lower ends whereby said arms may be compressed toward the shank to permit the insertion of the agitating members into the relatively narrow cover of the vessel and then to permit the expansion of said actuating members within the vessel.

In testimony whereof I hereunto affix my signature in the presence of one witness.

BENJAMIN F. FOWLER.

Witness:
R. B. HOSTETLER.

Copies of this patent may be obtained for five cents each, by addressing the "Commissioner of Patents, Washington, D. C."